United States Patent
Noguchi (12)

(10) Patent No.: US 6,819,523 B2
(45) Date of Patent: Nov. 16, 2004

(54) DATA STORING DEVICE INCLUDING A CYLINDRICAL OR HOLLOW CYLINDRICAL DATA STORING MEDIUM

(75) Inventor: Masahiro Noguchi, Miyagi (JP)

(73) Assignee: Tohoku Ricoh Co., Ltd., Shibata-gun (JP)

(*) Notice: Subject to any disclaimer, the term of this patent is extended or adjusted under 35 U.S.C. 154(b) by 135 days.

(21) Appl. No.: 10/222,884

(22) Filed: Aug. 19, 2002

(65) Prior Publication Data

US 2003/0053246 A1 Mar. 20, 2003

(30) Foreign Application Priority Data

Aug. 20, 2001 (JP) ........................................ 2001-249067

(51) Int. Cl.[7] ................................................ G11B 5/52
(52) U.S. Cl. ........................................................ 360/87
(58) Field of Search ........................................... 360/87

(56) References Cited

U.S. PATENT DOCUMENTS 4,567,535 A * 1/1986 Kinjo ........................... 360/87

FOREIGN PATENT DOCUMENTS

| JP | 64-51579 | 2/1989 |
|----|----------|--------|
| JP | 6-60607  | 3/1994 |
| JP | 11-86507 | 3/1999 |

* cited by examiner

*Primary Examiner*—A. J. Heinz
(74) *Attorney, Agent, or Firm*—Oblon, Spivak, McClelland, Maier & Neustadt, P.C.

(57) ABSTRACT

A data storing device of the present invention includes a cylindrical or hollow cylindrical data storing medium rotatable about its own axis and having a storage layer formed on its circumferential surface for storing data. A head adjoins the storage layer for writing or reading data in or out of the storage layer. A head moving mechanism causes the head to move back and forth along the axis of the data storing medium. A drive motor includes a stator and a rotor spaced from the stator and directly coaxially connected to the data storing medium.

19 Claims, 2 Drawing Sheets

DATA STORING DEVICE INCLUDING A CYLINDRICAL OR HOLLOW CYLINDRICAL DATA STORING MEDIUM

BACKGROUND OF THE INVENTION

1. Field of the Invention

The present invention relates to a data storing device for writing or reading data in or out of a cylindrical or hollow cylindrical data storing medium.

2. Description of the Background Art

Generally, a hard disk drive or similar data storing device includes a disk and a head facing each other and rotates the disk while moving the head in the direction of tracks to thereby write or read data in or out of the disk. The disk is implemented as a magnetic disk or a magneto-optical disk. An optical pickup is used in the case of a magneto-optical disk.

The problem with the data storing device implemented as a disk is that the position of the head relative to the disk varies due to the vibration or the eccentricity of the disk surface, obstructing accurate data writing and data reading. In light of this, Japanese Patent Laid-Open Publication Nos. 64-51579, 6-60607 and 11-86507 disclose cylindrical or hollow cylindrical data storing media that replace the disk type data storing medium.

However, it is difficult even with a cylindrical or hollow cylindrical data storing medium to densely store data because the axis of rotation of the medium rotating at high speed vibrates when subjected to an impact or a shock. The data recording medium is apt to hit against the head when noticeably vibrating and be damaged thereby. Further, the cylindrical or hollow cylindrical data recording medium is connected to a drive motor via a rotary shaft and other transmitting parts, resulting in an increase in the number of parts. Moreover, even when dynamic-pressure fluid bearings exist in a rotation transmission path, the bearings themselves need a number of parts and make the entire data storing device sophisticated in structure.

SUMMARY OF THE INVENTION

It is an object of the present invention to provide a data storing device capable of density storing data in a cylindrical or hollow cylindrical data storing medium while making the most of the merits of such a data storing medium.

It is another object of the present invention to provide a data storing device capable of allowing a data storing medium to smoothly rotate with a minimum number of parts.

A data storing device of the present invention includes a cylindrical or hollow cylindrical data storing medium rotatable about its own axis and having a storage layer formed on its circumferential surface for storing data. A head adjoins the storage layer for writing or reading data in or out of the storage layer. A head moving mechanism causes the head to move back and forth along the axis of the data storing medium. A drive motor for driving the data storing medium includes a stator and a rotor spaced from the stator and directly coaxially connected to the medium.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
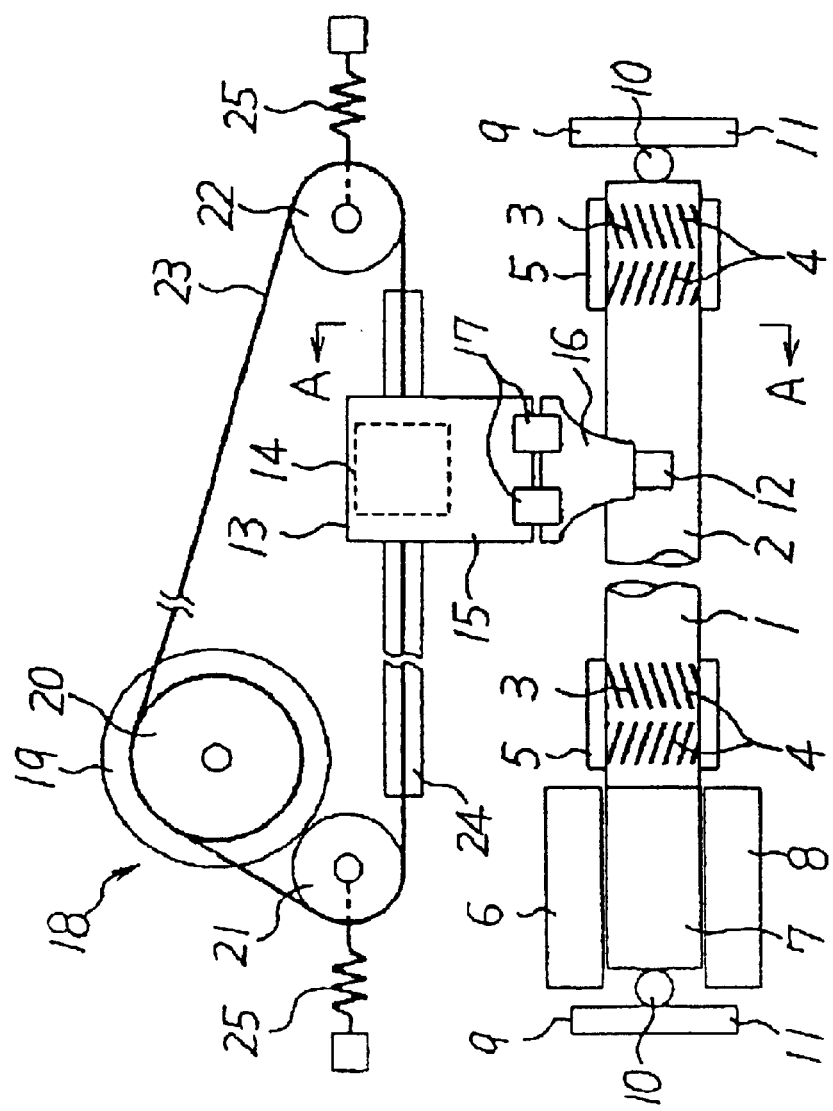
FIG. 1 is a plan view showing a data recording device embodying the present invention with part thereof being sectioned in the horizontal direction.
Figure 2:
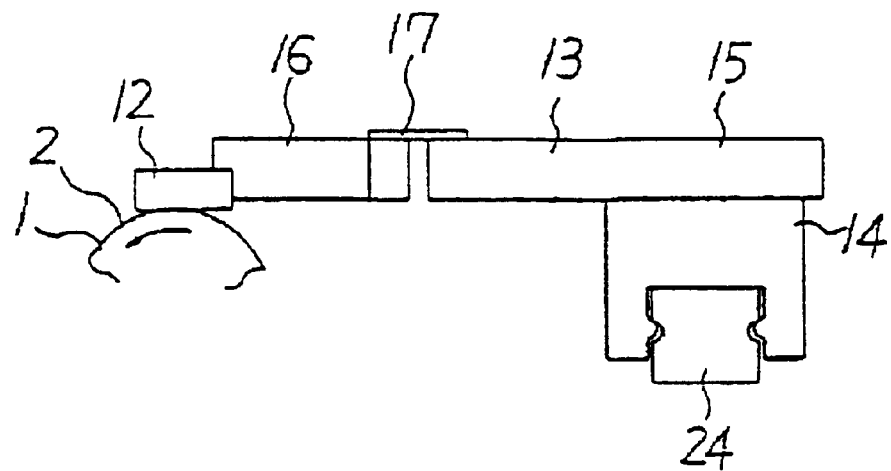
FIG. 2 is a vertically sectioned side elevation along line A—A of FIG. 1, showing a relation between a data storing medium and a head included in the illustrative embodiment.
Figure 3:
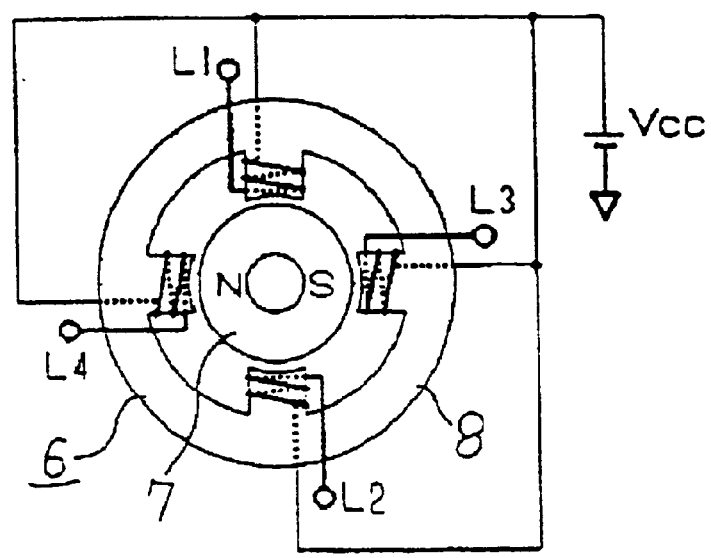
FIG. 3 is a side elevation showing a drive motor also included in the illustrative embodiment.

Referring to FIGS. 1 through 3, a data storing device embodying the present invention is shown and includes a cylindrical or hollow cylindrical data storing medium (simply medium hereinafter) 1. The medium 1 is made up of a nonmagnetic rod formed of synthetic quartz glass and a magnetization film 2 formed on the circumferential surface of the rod to play the role of a storage layer. More specifically, the rod has a length of 25 mm and a diameter of 3 mm. To form the magnetization film 2, Ni—P is plated on the rod to a thickness of 20 μm. Subsequently, a 20 nm thick Cr layer, a 60 nm thick Co—Pt—Cr layer and a 20 nm thick carbon layer are sequentially laminated on the Ni—P layer in this order.

While the medium 1 may be supported by slide bearings or roller bearings at opposite ends thereof, it is supported by dynamic-pressure fluid bearings 3 in the illustrative embodiment. Further, in the illustrative embodiment, the dynamic-pressure fluid bearings 3 directly support the medium 1. More specifically, a number of grooves 4 are formed on the circumferential surface of the medium 1 at opposite ends of the magnetization film 2. Annular bearing members 5 surround the grooves 4. In this configuration, the medium 1 itself forms part of the dynamic-pressure fluid bearings 3.

In the illustrative embodiment, the annular bearing members 5 are formed of stainless steel and 5 mm long each in the axial direction. The inner surfaces of the bearing members 5 are polished by electrolytic polishing such that they are spaced from the medium 1 by a gap of 3 μm each. The grooves 4 are inclined in the form of a letter V over the length of each bearing member 5 and 23 μm deep each. Parallel ones of the grooves 4 are arranged at a pitch of 100 μm. The grooves 4 may be directly formed in, the rod constituting the core of the medium 1. Alternatively, a film as thin as 23 μm may be formed on the rod and then selectively removed to form the 23 μm deep grooves 4.

In the illustrative embodiment, the grooves 4 are formed by the following sequence of steps. First, a positive resist film is coated on the rod formed of synthetic quartz glass and then dried. An excimer laser beam provided with a spot diameter of 3 μm by an optical lens intermittently illuminates the resist film in accordance with the desired groove pattern, thereby selectively exposing the resist film. Subsequently, after development and baking, the portions of the rod exposed to the outside are processed by diamond sand blasting, and then the blasted surfaces are extremely thinly dissolved by dilute fluoric acid. Finally, the resist film is removed from the rod by an organic solvent. Fluorine-containing oil is filled in the gaps between the circumferential surface of the medium 1 and the inner surfaces of the bearing members 5.

In the illustrative embodiment, a drive motor 6 for causing the medium 1 to rotate is implemented as a DC two-phase brushless motor including a rotor 7 and a stator 8. If desired, such a drive motor may be replaced with any other motor, e.g., an AC motor so long as the rotor 7 and stator 8 are spaced from each other. As shown in FIG. 3 specifically, in the drive motor 6, the rotor 7 has an inside diameter of 1 mm, an outside diameter of 3 mm and a length of 8 mm and is adhered or otherwise affixed to one end face of the medium 1 at one end thereof. The stator 8 is configured such that the minimum gap between it and the rotor 7 is 0.05 mm. The outside diameter and length of the stator 8 are 5 mm and 10 mm, respectively.

The other end of the rotor 7 and the other end of the medium 1 remote from the rotor 7 each are supported by a thrust bearing 9. Each thrust bearing 9 is made up of a ball 10 and a plate 11 supporting the ball 10. The ball 10 is formed of an alumina oxide crystal, metal, ceramic or similar material and held in contact with the center of the end face of the rotor 7 or that of the medium 1. The plate 11 is formed of, e.g., metal or ceramics.

The stator 8 of the drive motor 6, bearing members 5 and plates 11 are affixed to a casing or a frame including in the data storing device although not shown specifically.

In the illustrative embodiment, a magnetic head 12 is used as a head in combination with the magnetization film or storage layer 2. The head 12 is mounted on the free end of a 0.1 mm thick arm 13 that includes beams 15 and 16. A guide 14 is affixed to the beam 15 while the head 12 is mounted on the beam 16. The beams 15 and 16 are connected together by two biasing members (leaf springs) 17, which play the role of an actuator. In this configuration, the head 12 contacts the magnetization film 1 of the medium 1 with pressure determined by the biasing members 17.

The illustrative embodiment additionally includes head moving means 18 for causing the head 12 to move back and forth in the axial direction of the medium 1. The head moving means 18 includes a stepping motor 19, a drive pulley 20 directly connected to the stepping motor 19, a plurality of guide pulleys 21 and 22, an endless wire 23 passed over the pulleys 20 through 22, and a rail 24. The rail 24 allows the guide 14 affixed to the beam 15 to slide thereon in the axial direction of the medium 1. Part of the wire 23 is affixed to the arm 13. When the stepping motor 19 is driven to cause the drive pulley 20 to rotate, the drive pulley 20 causes the wire 23 to move with the result that the arm 13 moves along the medium 1 together with the head 12.

The guide pulleys 21 and 22, which determine the path of the wire 23, are formed of fluorocarbon resin or similar material having a small coefficient friction. Springs 25 constantly pull the guide pulleys 21 and 22, respectively, away from each other, thereby applying preselected tension to the wire 23. The wire 23 is formed of stainless steel or similar metal and provided with a ring-like configuration having a diameter of about 50 $\mu$m beforehand. The wire 21 is wound round the drive pulley 20 by two turns or more, preferably five turns, so as not to slip on the drive pulley 20.

To recognize the reference position of the head 12 to be moved by the head moving means 18, a Hall sensor or similar position sensor is mounted on any one of the drive pulley 20, wire 23 and arm 13 driven by the stepping motor 19. Alternatively, a reference position signal may be recorded in the end of the magnetization film 2 of the medium 1 such that a signal representative of the reference position is output via the head 12.

The head moving means 18 with the above configuration is only illustrative and may be replaced with, e.g., an electromagnetic linear motor drive system or an ultrasonic motor drive system, if desired.

How the illustrative embodiment writes or reads data in or out of the medium 1 with the head 12 will be described hereinafter. The drive motor 6 is driven to rotate the medium 1. At the same time, the stepping motor 19 is driven by a preselected number of steps in a desired direction to thereby cause the head 12 to move in the axial direction of the medium 1 together with the arm 13. It is noteworthy that the cylindrical or hollow cylindrical medium 1 is free from surface vibration particular to a disk type medium. The medium 1 can therefore store a greater amount of data for a unit area with a minimum of read/write errors. This successfully makes the medium 1 smaller in size than a disk type medium for a given storage capacity.

Although vibration may be transferred from the outside to the stator 8 of the drive motor 6 or the bearing members 5, the vibration is sparingly transferred to the rotor 7 via the stator 8 because the former is spaced from the latter. Also, vibration imparted to the bearing members 5 is transferred to the medium 1 little because the dynamic-pressure fluid bearings 3 support the medium 1, so that the medium 1 vibrates little in the radial direction. In addition, the thrust bearings 9 reduce the vibration of the medium 1 and that of the rotor 7 in the thrust direction.

The medium 1 with the grooves 4 plays the role of a rotary shaft of the dynamic-pressure fluid bearings 3. This reduces the number of parts of each fluid bearing 3 and thereby makes the entire data storing device simple and compact in configuration. This is also true when the grooves 4 are formed in the inner surfaces of the bearing members 5, because the bearing members 5 with the grooves 4 and part of the medium 1 constitute dynamic-pressure fluid bearings. Further, because the medium 1 is free from vibration in the axial direction, a high SN (Signal-to-Noise) ratio is achievable even when the data storing device is used while being carried by the user.

The medium 1 has an outside diameter of 3 mm with an allowance of 0.005 mm. It is likely that the position of the head 12 relative to the medium 1 varies due to play between the guide 14 and the rail 24 and irregularity in the linearity of the rail 24, causing the head 12 to rise above the medium 1. In light of this, in the illustrative embodiment, the biasing members 17 constantly bias the beam 16 downward and thereby cause the head 12 to constantly contact the medium 1 with preselected pressure, maintaining the above relative position constant.

The pressure of the head 12 to act on the medium 1, i.e., the force of the biasing members 17 should preferably be weak. In this condition, even when the head 12 rises above the medium 1 due to production errors mentioned above, the rise of the head 12 can be minimized. It is not difficult with the biasing members 17 to reduce the rise of the head 12 above the medium 1 to 0.025 $\mu$m or below, which does not effect data writing or data reading.

As stated above, the biasing members 17 are desirable means for controlling the position of the head 12 relative to the medium 1 and serve to increase the SN ratio at the time of data writing or data reading.

If desired, the biasing members 17 playing the role of an actuator may be replaced with a piezoelectric element, not shown, whose distortion varies in accordance with input power. The piezoelectric element further enhances accurate control over the relative position between the medium 1 and the head 12. In such a case, the position of the head 12 relative to the medium 1 may be measured at consecutive positions in the direction of movement of the head 12 at the time of adjustment on the production line, and a table listing power values corresponding one-to-one to the measured positions may be prepared. The table allows particular power to be fed to the piezoelectric element at each position in the direction of movement of the head 12.

The medium 1 may be implemented as a vertical data storing medium in order to further enhance dense recording.

In summary, it will be seen that the present invention provides a data storing device having various unprecedented advantages, as enumerated below.

(1) A cylindrical or hollow cylindrical data storing medium is free from surface vibration particular to a disk type medium. The medium can therefore store a greater amount of data for a unit area with a minimum of read/write errors. This successfully makes the medium smaller in size than a disk type medium for a given storage capacity. Vibration imparted from the outside is sparingly transferred to a rotor via a stator, so that the medium oscillates little in the radial direction. It follows that a high SN ratio is achievable even when the data storing device is used while being carried by the user. Further, the rotation of a drive motor is directly transferred to the medium, reducing the number of parts of the data recording device.

(2) Dynamic-pressure fluid bearings support the medium and allow it to smoothly rotate. This also effectively reduces the vibration of the medium in the radial direction. Because such bearings support the medium itself, the medium itself forms part of the bearings to thereby reduce the number of parts and implement a compact assembly.

(3) A thrust bearing intervening between one end of the medium and the rotor of the drive motor reduces the vibration of the medium in the thrust direction.

(4) An actuator controls the position of a head relative to the medium and increases the SN ratio at the time of data writing or data reading. When the actuator is implemented as biasing members biasing the head toward the medium, the head can contact the medium with preselected pressure and can therefore be easily positioned relative to the medium. When the actuator is implemented as a piezoelectric element, the position of the head relative to the medium can be further accurately controlled if power applied to the piezoelectric element is controlled.

Various modifications will become possible for those skilled in the art after receiving the teachings of the present disclosure without departing from the scope thereof.

What is claimed is:

1. A data storing device comprising:
    a cylindrical or hollow cylindrical data storing medium rotatable about an axis thereof and having a storage layer formed on a circumferential surface thereof for storing data with said cylindrical data storage medium having the cylindrical surface located between opposite cylindrical ends;
    a head adjoining said storage layer for writing or reading data in or out of said storage layer;
    head moving means for causing said head to move back and forth along the axis of said data storing medium; and
    a drive motor comprising a stator and a rotor spaced from said stator and directly coaxially connected to said data storing medium, said rotor and stator being disposed external to and at one end of said cylindrical data storage medium.

2. The device as claimed in claim 1, further comprising a pair of thrust bearings respectively supporting one end of said data storing medium and one end of said stator.

3. The device as claimed in claim 2, further comprising an actuator configured to control a position of said head relative to said data storing medium.

4. The device as claimed in claim 3, wherein said actuator comprises a biasing member constantly biasing said head toward said data storing medium.

5. The device as claimed in claim 3, wherein said actuator comprises
    a piezoelectric element whose distortion varies in accordance with input power.

6. The device as claimed in claim 1, further comprising an actuator configured to control a position of said head relative to said data storing medium.

7. The device as claimed in claim 6, wherein said actuator comprises a biasing member constantly biasing said head toward said data storing medium.

8. The device as claimed in claim 6, further comprising an actuator configured to control a position of said head relative to said data storing medium.

9. The device as claimed in claim 1, wherein the rotor is directly coaxially connected to said data storing medium.

10. The device as claimed in claim 1, wherein the rotor directly contacts an end face of said data storing medium.

11. A data storing device comprising:
    a cylindrical or hollow cylindrical data storing medium rotatable about an axis thereof and having a storage layer formed on a circumferential surface thereof for storing data;
    a head adjoining said storage layer for writing or reading data in or out of said storage layer;
    head moving means for causing said head to move back and forth along the axis of said data storing medium;
    a drive motor comprising a stator and a rotor spaced from said stator and directly coaxially connected to said data storing medium; and
    a dynamic-pressure fluid bearing rotatably supporting said data storing medium itself.

12. The device as claimed in claim 11, further comprising a pair of thrust bearings respectively supporting one end of said data storing medium and one end of said stator.

13. The device as claimed in claim 12, further comprising an actuator configured to control a position of said head relative to said data storing medium.

14. The device as claimed in claim 13, wherein said actuator comprises a biasing member constantly biasing said head toward said data storing medium.

15. The device as claimed in claim 13, wherein said actuator comprises a piezoelectric element whose distortion vales in accordance with input power.

16. The device as claimed in claim 11, further comprising an actuator configured to control a position of said head relative to said data storing medium.

17. The device as claimed in claim 16, wherein said actuator comprises a biasing member constantly biasing said head toward said data storing medium.

18. The device as claimed in claim 16, wherein said actuator comprises a piezoelectric element whose distortion varies in accordance with input power.

19. The device as claimed in claim 11, wherein in the rotor is directly coaxially connected to said data storing medium.

* * * * *